United States Patent
Paternoster et al.

(10) Patent No.: US 9,919,476 B2
(45) Date of Patent: Mar. 20, 2018

(54) MANUFACTURING A THREE-DIMENSIONAL OBJECT LAYER BY LAYER

(71) Applicant: EOS GmbH Electro Optical Systems, Krailling (DE)

(72) Inventors: Stefan Paternoster, Andechs (DE); Jochen Philippi, Gräfelfing (DE)

(73) Assignee: EOS GmbH Electro Optical Systems, Krailling (DE)

( * ) Notice: Subject to any disclaimer, the term of this patent is extended or adjusted under 35 U.S.C. 154(b) by 0 days.

(21) Appl. No.: 14/342,643

(22) PCT Filed: Jun. 27, 2013

(86) PCT No.: PCT/EP2013/063545
§ 371 (c)(1),
(2) Date: Mar. 4, 2014

(87) PCT Pub. No.: WO2014/012764
PCT Pub. Date: Jan. 23, 2014

(65) Prior Publication Data
US 2015/0202826 A1    Jul. 23, 2015

(30) Foreign Application Priority Data
Jul. 18, 2012   (DE) .................. 10 2012 212 587

(51) Int. Cl.
*B29C 41/02*    (2006.01)
*B29C 41/52*    (2006.01)
(Continued)

(52) U.S. Cl.
CPC ........ *B29C 67/0088* (2013.01); *B29C 64/153* (2017.08); *B29C 64/20* (2017.08);
(Continued)

(58) Field of Classification Search
CPC . B29C 2035/0838; B29C 41/02; B29C 41/52; B29C 67/0077; B29C 68/0088; B29C 71/04; B29C 64/153; B29C 64/386
(Continued)

(56) References Cited

U.S. PATENT DOCUMENTS 5,932,059 A     8/1999  Langer et al.
6,998,087 B1 *  2/2006  Hanson ............... B29C 47/0007
                                                    264/308
(Continued)

FOREIGN PATENT DOCUMENTS

DE        4309524 C1    11/1993
DE       19853814 A1     5/2000
(Continued)

OTHER PUBLICATIONS

PCT International Search Report dated Oct. 22, 2013 issued on corresponding International Patent Application No. PCT/EP2013/063545 and English translation thereof.

*Primary Examiner* — Leo B Tentoni
(74) *Attorney, Agent, or Firm* — Locke Lord LLP; Daniel J. Fiorello; Scott D. Wofsy

(57) ABSTRACT

A method for manufacturing a three-dimensional object layer by layer by applying and selectively solidifying a constituent material in powder form layer by layer by supply of energy has the steps: applying a layer (32+33) of the powdery constituent material (11) having a pre-determined height (h) onto a support (6) or a previously at least selectively solidified layer of the constituent material, and supplying energy (14) from an energy source (13) into the applied layer at positions corresponding to the cross sectional area of the object to be manufactured for selectively solidifying the constituent material. The step of applying the layer having the pre-determined height (h) is subdivided into a step of applying a first partial powder layer (32) having a
(Continued)

first height (h1) which is smaller than the pre-determined height (h), and a step of at least applying a second partial powder layer (33) having a second height (h2) which is smaller than the pre-determined height (h), wherein the total height. (h1+112+ etc.) of the applied partial powder layers (32, 33, etc.) corresponds to the pre-determined height (h), and between the step of applying the first partial powder layer and the step of applying the second and possibly further partial powder layers, the powder layer applied last is heated.

19 Claims, 3 Drawing Sheets

(51) Int. Cl.
| | |
|---|---|
| *B29C 67/00* | (2017.01) |
| *B33Y 10/00* | (2015.01) |
| *B33Y 30/00* | (2015.01) |
| *B33Y 50/02* | (2015.01) |
| *B29C 64/153* | (2017.01) |
| *B29C 64/20* | (2017.01) |
| *B29C 64/386* | (2017.01) |
| *B29C 35/08* | (2006.01) |
| *B29K 101/12* | (2006.01) |
| *B29L 9/00* | (2006.01) |

(52) U.S. Cl.
CPC ............ *B29C 64/386* (2017.08); *B33Y 10/00* (2014.12); *B33Y 30/00* (2014.12); *B33Y 50/02* (2014.12); *B29C 2035/0838* (2013.01); *B29K 2101/12* (2013.01); *B29L 2009/00* (2013.01); *Y10T 428/31728* (2015.04)

(58) Field of Classification Search
USPC ...................................... 264/40.6, 406, 497
See application file for complete search history.

(56) References Cited

U.S. PATENT DOCUMENTS

| | | | |
|---|---|---|---|
| 8,741,194 B1* | 6/2014 | Ederer | ...................... B22C 9/00 264/113 |
| 2005/0268998 A1* | 12/2005 | Bostanjoglo | ........ B29C 67/0077 148/538 |
| 2007/0196561 A1 | 8/2007 | Philippi et al. | |
| 2008/0131104 A1 | 6/2008 | Philippi | |
| 2008/0233302 A1 | 9/2008 | Elsner et al. | |
| 2009/0295042 A1 | 12/2009 | Pfister et al. | |
| 2010/0192806 A1 | 8/2010 | Heugel et al. | |
| 2011/0165340 A1 | 7/2011 | Baumann | |
| 2011/0237731 A1 | 9/2011 | Paternoster | |

FOREIGN PATENT DOCUMENTS

| | | |
|---|---|---|
| DE | 102005024790 A1 | 12/2006 |
| DE | 102007040755 A1 | 3/2009 |
| EP | 1600282 A1 | 11/2005 |
| EP | 2156942 A1 | 2/2010 |
| EP | 2340925 A1 | 7/2011 |
| WO | WO-2005113219 A1 | 12/2005 |

* cited by examiner

PRIOR ART

MANUFACTURING A THREE-DIMENSIONAL OBJECT LAYER BY LAYER

This application is the national phase under 35 U.S.C. § 371 of PCT International Application No. PCT/EP2013/063545 which has an International filing date of Jun. 27, 2013, which claims priority to German Patent Application No. 10 2012 212 587.6, filed Jul. 18, 2012. The contents of these applications are incorporated herein by reference in their entirety.

The present invention relates to an apparatus and a method for manufacturing a three-dimensional object layer by layer, especially to an apparatus and a method for manufacturing a three-dimensional object by solidifying a constituent material layer by layer at positions corresponding to the cross sectional area of the object to be manufactured in the respective layer by supplying energy.

Such a method which is known by the name "selective laser sintering" as well as an associated apparatus for performing the method are known from DE 10 2005 024 790 A1. According to this document, a thin layer of the constituent material in powder form is applied first, using an applicator, and then, it is solidified at the positions corresponding to the cross sectional area of the object by impact of a laser beam. These two steps are alternately replied until a three-dimensional object to be manufactured is completed. In order to improve the process stability and the quality of the completed objects, the powder is pre-heated by a radiation heating between the application and the solidification. The temperature of the applied powder layer is measured by a temperature measuring unit, and the power of the radiation heating is feedback-controlled correspondingly.

The quality of the manufactured object depends on the type of powder used. Especially objects manufactured from a powder having an increased melting viscosity may have depressions at their surface (i.e. indentations in the surface of the manufactured object, generally also referred to as "orange peel") whereby the quality of the object is reduced.

In order to solve this problem, special powders have been developed which, however, are expensive and thus increase the costs. Further, the components manufactured therefrom have inferior mechanical properties.

Further, special geometries for applicator blades have been proposed by which the occurrence of depressions may be reduced. For this purpose, however, a modification of existing apparatuses is required.

DE 43 09 524 C2 discloses a method for manufacturing a three-dimensional object by means of stereo-lithography, wherein the object to be manufactured is subdivided into a core region and a mantle region. The mantle region, in which high precision and quality of the surface is important, is solidified after each application of a layer in its entire area. In the core region, in which low distortion and low building times are important, only a honeycomb structure is solidified. In a special embodiment, plural layers of the material are first applied and solidified in the mantle region. Only after a multiple subsequent application of layers and solidification of the mantle region, the material of the core region is solidified. The method is above all disclosed for liquid constituent materials, as an alternative, however, material in powder form is indicated, too. The problem of the occurrence of depressions, however, is not mentioned anywhere in this document.

The object of the present invention is to provide an apparatus and a method for manufacturing a three-dimensional object by solidifying a constituent material in powder form layer by layer by which surfaces having a high quality which especially do not have depressions can be generated even if a conventional powder and conventional geometries of the blades are used.

The object is achieved by a method according to claim 1, a device according to claim 11 and a computer program according to claim 16. Further developments of the invention are indicated in the corresponding dependent claims.

Surprisingly, it has been determined that by applying a layer to be solidified in two or more subsequent application steps, components having an improved surface quality and less depressions (orange peel) may be generated.

Further features and advantages of the invention will appear from the description of embodiments with reference to the enclosed figures.

Figure 1:
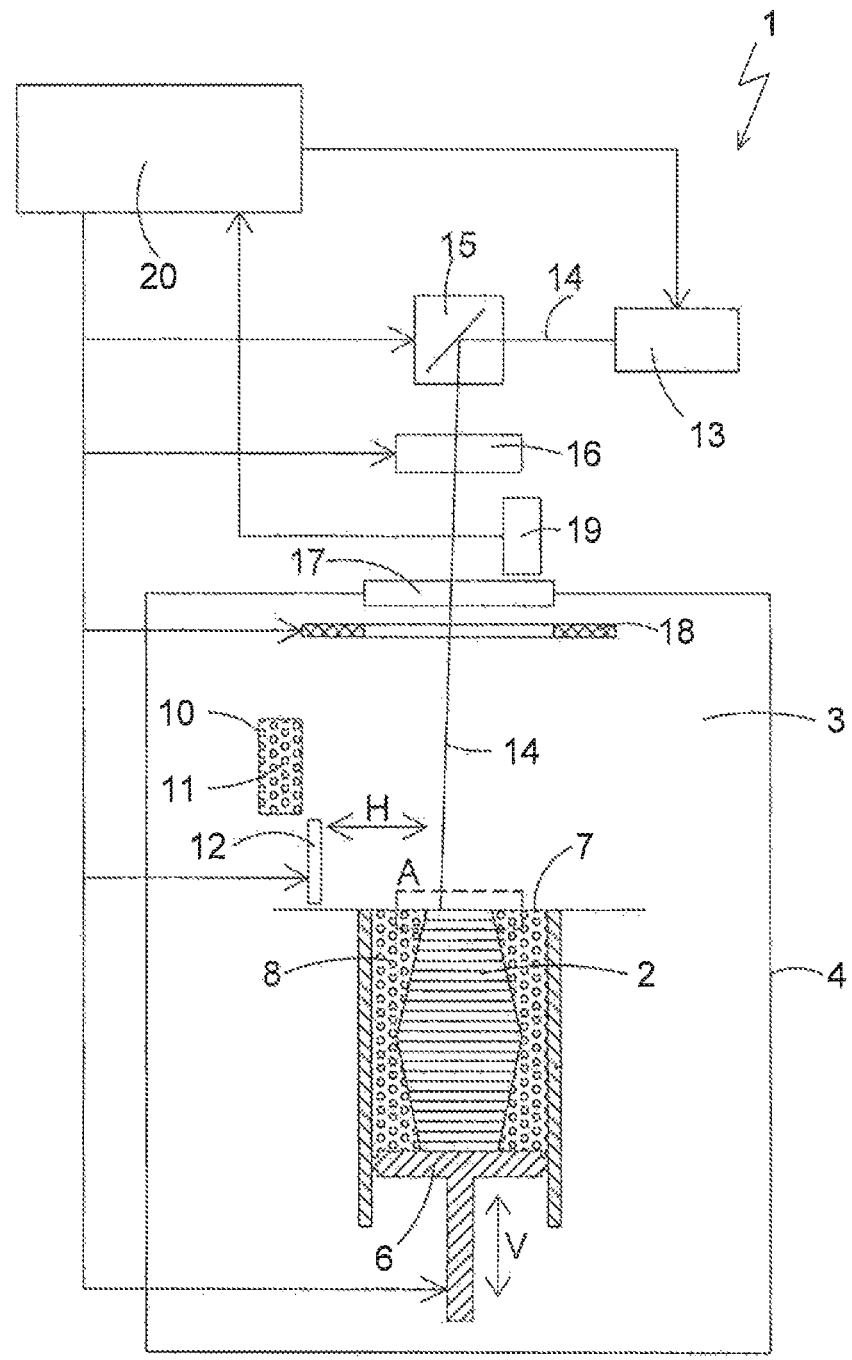
FIG. 1 is a schematic view, shown partially in a sectional view, of an apparatus for manufacturing a three-dimensional object layer by layer which is suited for performing the present invention.

With reference to FIG. 1, an embodiment of an apparatus is described now which is suited for performing the method of the present invention. The apparatus shown in FIG. 1 is a laser sintering apparatus 1. For building the object 2, it comprises a process chamber 3 which is defined to the outside by a chamber wall 4 and serves as a building space for the object.

Within the process chamber, a container is arranged which is open at its top and in which a support having an upper surface which is substantially in parallel to the upper edge of the building container is arranged. The support 6 serves to support the object 2 to be manufactured, and it is, as indicated by a vertical double arrow V in FIG. 1, moveable in a vertical direction by a (not shown) height adjustment unit. The support 6 is respectively adjusted in the vertical direction in a manner that the upper surface of a layer to be solidified is within a working plane 7. In FIG. 1, the object 2 to be manufactured is shown in an intermediate state in which already a plurality of layers of the powdery constituent material in have been selectively solidified and it is surrounded by constituent material 8 which has remained unsolidified.

The laser sintering apparatus further has a reservoir 10 for accommodating a constituent material 11 in powder form which can be solidified by electromagnetic radiation, and an applicator 12 for applying the constituent material 11 to the working plane 7. The applicator 12 is, as indicated in FIG. 1 by a horizontal double arrow H, moveable in a horizontal direction in parallel to the working plane.

The laser sintering apparatus further has a laser 13 generating a laser beam 14. The laser beam 14 is deflected by a deflection unit 15 and focused by a focusing unit 16 via a coupling window 17 in the wall of the process chamber 3 to a predetermined point in or immediately below the working plane 7.

For pre-heating the powder, a radiation heating 18 is provided. Further, a temperature measuring unit 19 is provided which is preferably realized by a point parameter.

Finally, a control unit 20 is provided by which the components of the apparatus are controlled in a coordinated manner to perform the building process. Amongst others, the control unit 20 controls the vertical movement of the support 6 the horizontal movement of the applicator 12 and the deflection unit 15. Possibly, also the focusing unit 16, the intensity of the laser 13 and the power of the radiation heating 18 are controlled. For a temperature control, the control unit 20 receives the measurement results of the temperature measuring unit 19. The control unit may comprise a CPU the operation of which is controlled by a computer program.

Figure 2:
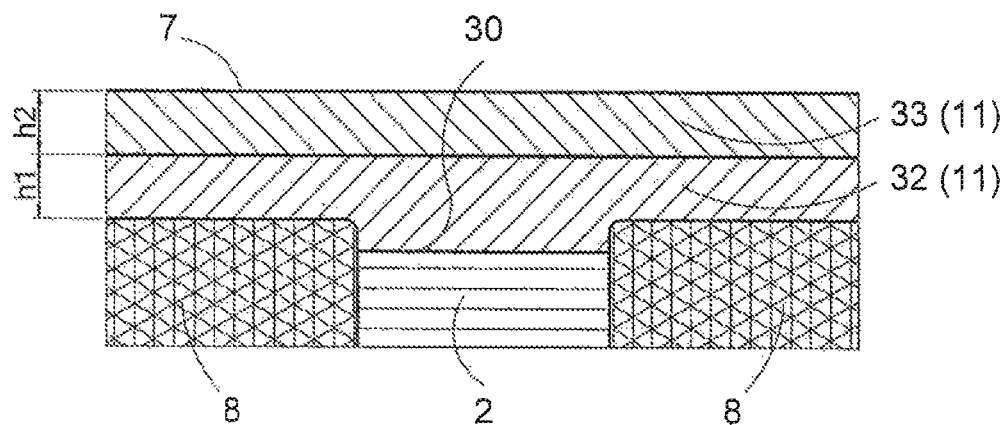
FIG. 2 is a magnified sectional view of a section which is surrounded in FIG. 1 by a dashed line and shows a state during the execution of the method of the present invention.

With reference to FIG. 2, an operation of the laser sintering apparatus 1 according to the invention for manufacturing a three-dimensional object is described now.

FIG. 2 shows in a magnified way a section A which is surrounded by a dashed line in FIG. 1. The only partially completed object 2 is surrounded by powder 8 which has remained unsolidified. Since the powder reduces its volume during the solidification, the surface of the object 2 lies below the one of the unsolidified powder 8, so that an indentation 30 is formed at this position.

For applying a powder layer of the thickness h, the support 6 first is lowered by a first height h1 which is less than the desired layer thickness h. Using the applicator 12, a first layer 32 of the powdery constituent material 11 form is now applied. The application is performed at least across the entire cross sectional area of the object to be manufactured, preferably across the entire building area. The thickness of this first partial powder layer 32 thus also is h1, except where it additionally fills the indentation 30. Thereby, a plane surface of the first partial powder layer 32 results.

Without performing an exposure of the first partial powder layer 32 or a partial area of this layer by the laser 13, the support 6 is now lowered by a second height h2 which is smaller than the desired thickness h and which achieves, together with the first height h1, the desired thickness h (h=h1+h2). Preferably, h1 and h2 are equal and correspond to a half of h (h1=h2+h/2), but this is not compulsory. Using the applicator 12, a second layer 33 of the powdery constituent material 11 in is now applied. The application of the second partial powder layer 33, too, is performed at least across the entire cross sectional area of the object to manufactured, preferably across the entire building area. The thickness of this second partial powder layer 33 thus is also h2 so that the total thickness of the newly applied powder 11, i.e. the total thickness of the layers 32 and 33, is h. Thus, a plane surface of the second partial powder layer 33 in the working area 7 results.

Before the exposure by the laser 13, the newly applied powder 11 in the two partial powder layers 32 and 33 first has to be brought to the process temperature required. Heating the powder therein is achieved from above by the radiation heating 18, in fact between the application of the two layers as well as after the application of the second layer. The powder temperature is therein detected by the temperature measuring unit 19 and forwarded to the control unit 20 which controls the radiation heating in a way that a feedback temperature control of the powder temperature is achieved. Preferably, the measuring field of the temperature measuring unit 19 is directed to a portion of the powder layer in which no solidification of the powder by the laser beam 14 is performed. In order to reach the required process temperature in a shorter time, the temperature feedback control can be omitted in the period between the two application processes, and during this time, the radiation heating may be operated with a constant power instead.

Figure 3:
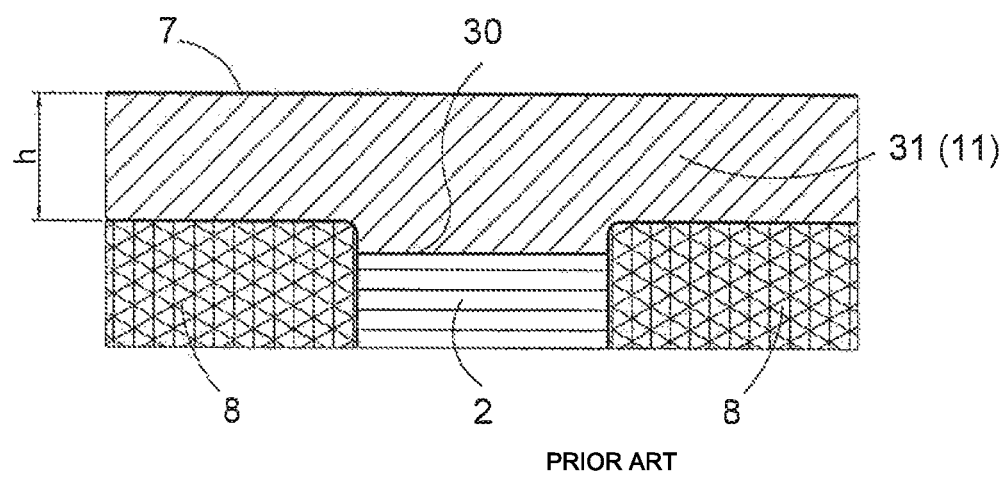
FIG. 3 is a magnified sectional view of a section which is surrounded in FIG. 1 by a dashed line and shows a state during the execution of a comparative method in which an action is taken as in a usual method.

With reference to FIG. 3, a method performed as a comparison is described now in which the subdivision of the layer to be applied into two or more layers is omitted. Parameters and procedures which are identical to the method of the invention are not described again. FIG. 3 shows, in the same way as FIG. 2, in a magnified way the section A which is surrounded in FIG. 1 by a dashed line. The upper end of the only partially completed object 2, the unsolidified powder 8 as well as the indentation 30 are exactly as shown in FIG. 2 and therefore are not described again. According to the comparative method for applying a powder layer having the thickness h, the support 6 is lowered by a height h. Using the applicator 12, a new powder layer 31 is now applied, the thickness of which corresponds to the lowering of the support, i. e. also h. Thus, the upper surface of the new powder layer 31 lies within the working plane 7.

Before the exposure by the laser 13 can be performed, the surface of the newly applied powder layer 31 is again brought to the required process temperature by the radiation heating.

With the same powder material and the same objects generated, the method of the invention results, in comparison to the comparative example, to a significantly smoother course of the layer and a significant reduction of the depressions and thus to a significantly enhanced surface quality. Thus, a sufficient quality of the surface can be achieved even if a powder having an increased melting viscosity is used. The time required for heating the two layers which significantly determines the process time is in total in the same order as the time required for heating the total layer in the comparative method, so that the manufacturing time of the object is not or not significantly increased.

Applying the two partial powder layers can be performed described above by lowering the support twice and moving the applicator twice across the area to be covered. In a modification of the method of the invention, it also may be achieved by a single lowering of the support and a single movement of the applicator, as it is schematically indicated in FIGS. 4 and 5.

Figure 4:
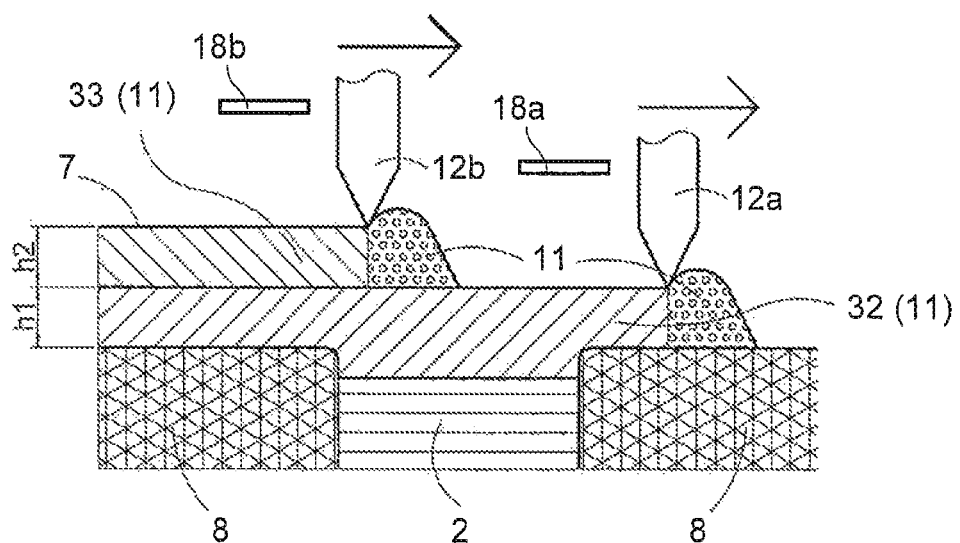
FIG. 4 is a magnified sectional view similar as FIG. 2 and shows a state during the execution of a modification of the method of the present invention.

As shown in FIG. 4, an applicator is used which has two partial layer applicators 12a, 12b which are arranged one behind the other in the direction of movement. The support is lowered by the total height h (h1+h2) of the layer to be applied. The front partial layer applicator 12a in the direction of the movement is adjusted to a height above the previously applied layer which corresponds to the thickness h1 of the first partial powder layer 32, and the second partial layer applicator 12b is adjusted to a height which corresponds to the sum of the thicknesses (h1+h2) of the two partial powder layers 32, 33. The height difference between the two partial layer applicators thus corresponds to the thickness h2 of the second partial powder layer 33. Powder applied in front of the partial layer applicators is extended by the partial layer applicators, respectively, to a smooth layer 32, 33. Therein, the second partial powder layer 33 is formed at positions at which, shortly before, the first partial powder layer 32 had been formed. To make is possible also in this case that heating may be effected between the application of the two layers, a heating element 18a, 18b is arranged behind each partial layer applicator 12a, 12b in the direction of movement, is moved together with the partial layer applicator and is formed, for example, by a radiation heating.

Figure 5:
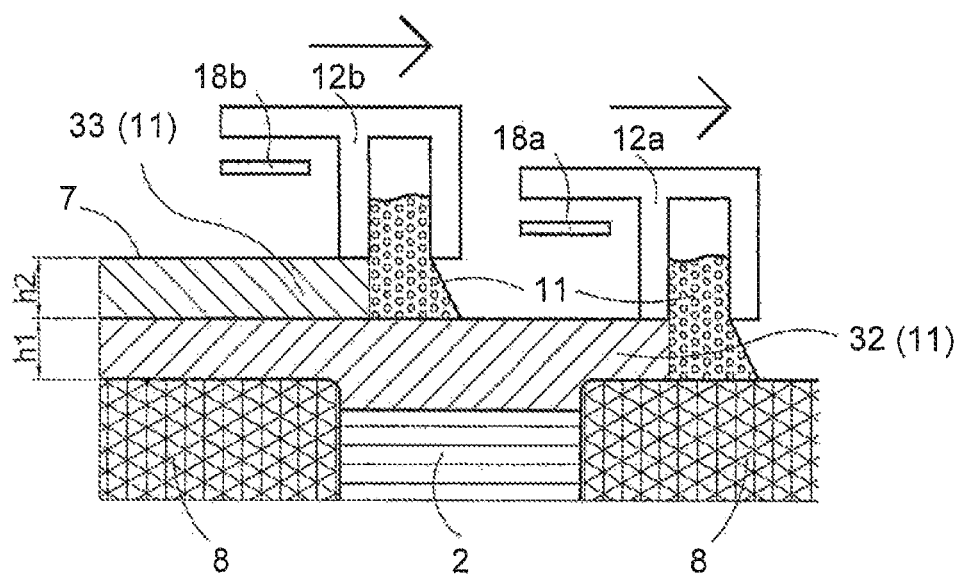
FIG. 5 is a magnified sectional view similar as FIG. 2 and shows a state during the execution of another modification of the method of the present invention.

A further modification is shown in FIG. 5. Herein, the applicators are provided with two blades which form, between them, a reservoir for the powder to be applied. The powder is extended by the rear blade in the direction of movement, respectively, to a smooth layer 32, 33. Also in this modification, there is a heating element 18a, 18b arranged behind each partial layer applicator 12a, 12b in the direction of movement.

Using the two modifications, an application is also possible at different directions of movement of the applicator. First, the height positions of the two partial layer applicators have to be exchanged, since the previously front partial layer applicator now is the rear partial layer applicator and vice versa. Further, it has to be provided that the heating element is arranged behind the partial layer applicator, respectively, in the direction of movement. This may be achieved by deviating a single heater element or by arrangement of heater elements on both sides of the corresponding partial layer applicator.

Depending on the properties of the powder, the process parameters used such as layer thickness and powder temperature etc., and the requirements to the quality of the completed object, it may be advantageous to subdivide the powder layer to be applied and to be exposed into more than two partial powder layers which are subsequently applied above each other before an exposure is effected. The desired height then is the sum of the heights of the individual partial powder layers (h+h1+h2 . . . +hn). The heights h1 through hn may be equal to each other or different from each other. Heating is performed after the application of each of these individual partial powder layers. The temperature feedback control may be omitted in an analogous way between applying the first partial powder layer and applying the last partial powder layer, and the radiation heating may be operated with its maximum power. In the modification of the application of the layer, the applicator in this case has three or more partial layer applicators and heating elements.

The subdivision of the layer for improving the surface quality (smoother course of the layer, avoiding depressions) into one or more correspondingly thinner partial powder layers which are solidified only after the application of the last partial powder layer is of a special importance for a peripheral region along the outer outline of the object to be manufactured. A solidification of the material may be effected in a core region after applying each layer, whereas it is effected in the peripheral region or at the outer outline only after the application of the last layer.

Even if the present application has been described with reference to a laser sintering apparatus, it is not restricted to laser sintering. It can be applied to any method for manufacturing three-dimensional objects by application and selective solidification of a powdery constituent material by supply of energy. Instead of a laser, for example a light emitting diode (LED), a LED array, an electron beam or each other energy or radiation source which is suited for solidifying the powdery constituent material may be used. The invention may also be applied to the selective mask sintering in which a mask and an extended light source are used instead of a laser beam, or to the absorption or inhibition sintering. Especially, the invention generally relates to the manufacturing of an entire object only by means of application and a selective solidification of a powdery constituent material.

All the types of plastic powders may be used as constituent materials. Examples for appropriate plastic powders are polyamides, for example PA11 or PA12, and polyetherketones or polyaryletherketones such as PEEK. In an especial advantageous way, the method of the invention may be used for unregulated polyamides which succumb to a specifically strong deterioration at laser sintering.

The invention claimed is:

1. A method for manufacturing a three-dimensional object layer by layer by applying and selectively solidifying a constituent material in powder form layer by layer by supply of energy, the method comprising the steps:
   (a) applying a layer of the powdery constituent material having a pre-determined height H onto a support or a previously at least selectively solidified layer of the constituent material,
   wherein the step (a) of applying the layer having the pre-determined height is subdivided into a step of applying a first partial powder layer having a first height H1 which is smaller than the pre-determined height H, and a step of applying at least a second partial powder layer having a second height H2 which is smaller than the pre-determined height H onto the first partial powder layer,
   wherein the total height H1+H2 of the applied partial powder layers corresponds to the predetermined height H, and
   between the step of applying the first partial powder layer and the step of applying the second partial powder layers, the first powder layer is pre-heated to a required process temperature,
   wherein between the step of applying the first partial powder layer and the step of applying the second and possibly further partial powder layers, at least in a peripheral region of the object to be manufactured, no supply of energy for selectively solidifying the constituent material is effected,
   then (b) selectively supplying energy from an energy source into the applied layer formed by the first and second partial powder layers at positions corresponding to the cross sectional area of the object to be manufactured for selectively solidifying the constituent material, and
   (c) repeating the steps (a) and (b) until the object is completed.

2. The method according to claim 1, wherein between the step of applying the first partial powder layer and the step of applying the second and possibly further partial powder layers, no supply of energy for selectively solidifying the constituent material is effected in the entire cross section of the object to be manufactured.

3. The method according to claim 1, wherein the temperature of the applied layer of the powdery constituent material is measured and heating the applied layer is feedback-controlled depending on the measured temperature of the applied layer.

4. The method according to claim 3, wherein the feedback-control of the temperature is interrupted between the application processes of the partial powder layers, and heating is performed with a constant power.

5. The method according to claim 1, wherein the energy is supplied in form of an electromagnetic radiation.

6. The method according to claim 1, wherein the constituent material is a plastic powder.

7. The method according to claim 1, wherein applying the layer having the predetermined height is subdivided into applying two partial powder layers having the same height.

8. The method according to one of claim 1, wherein applying the layer having the predetermined height is subdivided into applying three or more partial powder layers.

9. The method according to claim 1, wherein applying the two or more partial powder layers is effected during a horizontal movement of two or more partial layer applicators travelling one behind the other.

10. The method according to claim 9, wherein applying the two or more partial powder layers is effected during the horizontal movement of the two or more partial layer applicators travelling one behind the other into one direction as well as during the horizontal movement of partial layer applicators into the opposite direction, the height positions of the individual partial layer applicators being exchanged at a change of the direction of movement.

11. The method according to claim 5, wherein the electromagnetic radiation is a radiation of a laser.

12. The method according to claim 6, wherein the plastic powder is made from a polyamide or a polyaryletherketone.

13. The method according to claim 6, wherein the plastic powder is made from PA11 or PA12 or PEEK or unregulated polyamides.

14. A method for manufacturing an object using an additive manufacturing process, wherein an object is built-up in layerwise manufacture from a powder build material, the method comprising the steps of:
applying a first partial layer of powder,
applying at least another partial layer of powder on the first partial layer,
where the first and another partial layers form a total layer having a layer thickness,
then, only after applying the first and another partial layer, supplying energy from an energy source to selectively solidify desired areas of the total layer to form a cross-section of the object, and
repeating forming subsequent total layers by applying first and another partial layers with selective solidification of each total layer on the total layer previously solidified to form an object.

15. The method according to claim 14 including the further step of applying energy to pre-heat the first partial layer to a required process temperature before applying the another partial layer.

16. The method according to claim 15 including the further step of applying energy to pre-heat the another partial layer to a required process temperature in case there are more than two partial layers comprising the total layer.

17. A method for manufacturing an object using an additive manufacturing process, wherein an object is built-up in layerwise manufacture from a powder build material, the method comprising the steps of:
applying a first partial layer of powder,
applying a second partial layer of powder on the first partial layer,
where the first and second partial layers comprise a total layer,
then, only after forming the total layer, supplying energy from an energy source to selectively solidify desired areas of the total layer to form a cross-section of the object, and
repeating forming subsequent total layers from partial layers with selective solidification of each total layer on the total layer previously solidified to form an object.

18. A method for manufacturing an object using an additive manufacturing process, wherein an object is built-up in layerwise manufacture from a powder build material, the method comprising the steps of:
applying a first partial layer of powder,
pre-heating the first partial layer to a required process temperature of the build material,
applying at least another partial layer of powder on the first partial layer,
where the first and another partial layers form a total layer having a layer thickness,
supplying energy from an energy source to selectively solidify desired areas of the total layer to form a cross-section of the object, wherein the selective solidification is only effected after the partial layers have been applied, and
repeating forming subsequent total layers from partial layers with selective solidification of each total layer on the total layer previously solidified to form an object.

19. A method for manufacturing a three-dimensional object layer by layer by applying and selectively solidifying a constituent material in powder form layer by layer by supply of energy, the method comprising the steps:
(a) applying a layer of the powdery constituent material having a pre-determined height H onto a support or a previously at least selectively solidified layer of the constituent material,
wherein the step (a) of applying the layer having the pre-determined height is at least once in a plurality of steps (a) required for manufacturing the three-dimensional object subdivided into a step of applying a first partial powder layer having a first height H1 which is smaller than the pre-determined height H, and a step of applying at least a second partial powder layer having a second height H2 which is smaller than the pre-determined height H onto the first partial powder layer,
wherein the total height H1+H2 of the applied partial powder layers corresponds to the predetermined height H, and
between the step of applying the first partial powder layer and the step of applying the second partial powder layers, the first powder layer is pre-heated to a required process temperature,
characterized in that
between the step of applying the first partial powder layer and the step of applying the second and possibly further partial powder layers, at least in a peripheral region of the object to be manufactured, no supply of energy for selectively solidifying the constituent material is effected,
then (b) selectively supplying energy from an energy source into the applied layer formed by the first and second partial powder layers at positions corresponding to the cross sectional area of the object to be manufactured for selectively solidifying the constituent material, and
(c) repeating the steps (a) and (b) until the object is completed.

* * * * *